Patented Dec. 28, 1948

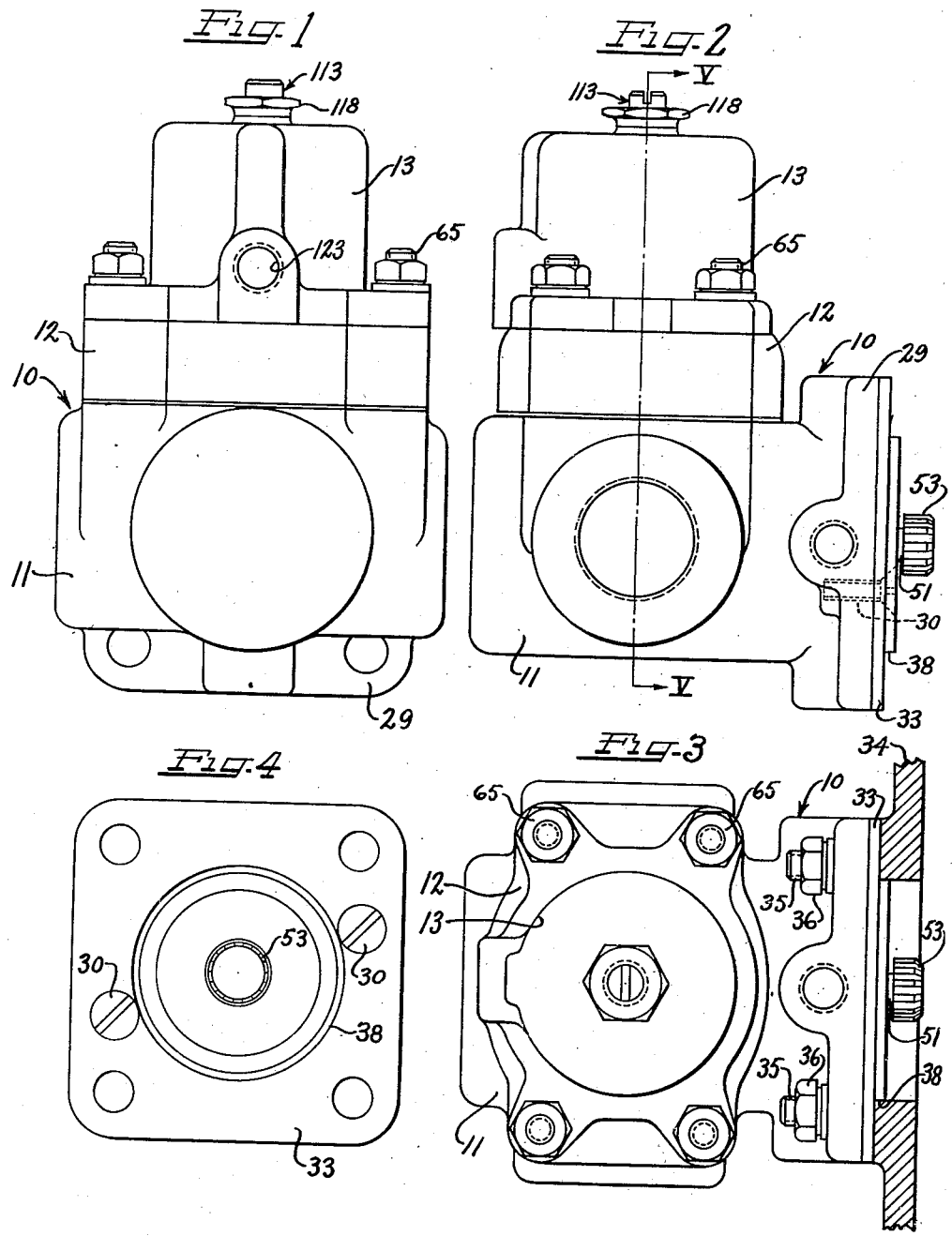

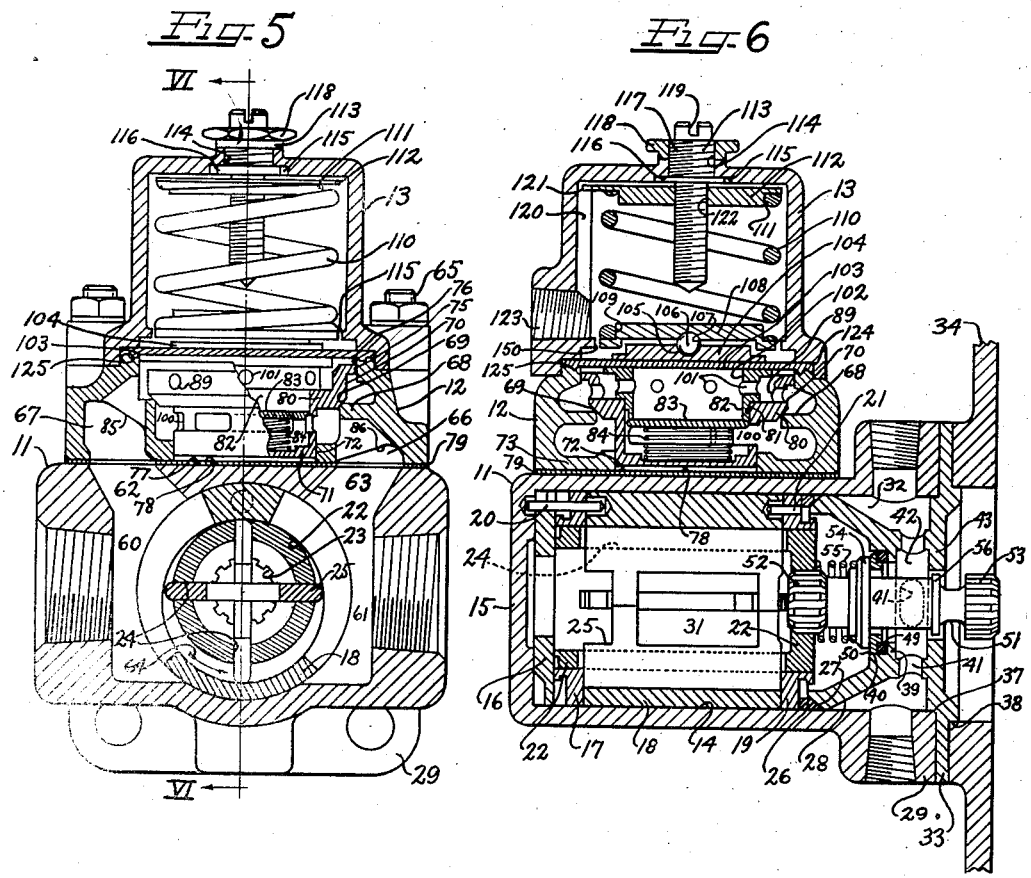

2,457,643

UNITED STATES PATENT OFFICE 2,457,643

ROTARY PUMP AND PACKING THEREFOR

Michele Caserta, Detroit, Mich.

Original application June 12, 1941, Serial No. 397,763. Divided and this application March 24, 1943, Serial No. 480,278

6 Claims. (Cl. 103—138)

1

This invention relates to a rotary pump and more particularly, although not so restricted, to the type used in aircraft fuel transfer installations.

The subject matter of this application has been divided from my copending patent application Serial 397,763, filed June 12, 1941, entitled "Fluid transfer mechanism" now Patent No. 2,353,545, issued July 11, 1944.

Usually in such installations a pump, driven for instance by the engine, transfers the gasoline or other fuel from the reservoir to the carburetor or other distributing device.

An object of the present invention is to provide a rotary pump which is simple, compact, light, easily manufactured and assembled, and generally efficient.

A further object of the invention is to provide a rotary pump, having a chamber which is closed at one end and open at the other to receive therethrough the elements of the pump for assembly in said chamber, and having a sealing gland for said open end that extends into said chamber for cooperation with said pump elements and that is provided with an integral end abutment flange for attachment to said open end to hold said pump elements in assembled relationship.

A further object of this invention is to provide a rotary pump having a cup-shaped chamber into which the pump elements may be simply inserted for assembly without the use of special tools and in which said elements may be held in assembled relationship by a sealing gland that closes the open end of said chamber and that holds said pump elements in assembled relationship.

These and other objects will be more apparent from the following description and from the accompanying drawings.

Figures 1, 2, and 3 are an end view, a side elevational view, and a plan view, respectively, of a fuel pump embodying the present invention, Figure 3 showing also partly in section a fragment of a mounting flange to which said pump may be attached, and some of the mounting bolts.

Figure 4 is an elevational view of the flange end only of said pump.

Figure 5 is a cross-sectional view taken substantially on line V—V of Figure 2, some of the parts being left in elevation for clearness of illustration.

Figure 6 is a similar cross-sectional view taken substantially on line VI—VI of Figure 5.

On the drawings:

The fuel pump assembly is indicated by the numeral 10 and includes a pump housing 11, a valve housing 12, and a cover 13.

The pump housing 11 is provided with a bore 14, terminated by an end wall or thrust face 15. In said bore 14 are lodged, in line and preferably press fitted, a thrust bearing 16, a first journal bearing 17, an eccentric pump chamber or liner 18, and a second journal bearing 19. A pin 20 prevents the rotation of parts 16 to 18 relative to each other and relative to housing 11, while pin 21 prevents the relative rotation of chamber 18 and bearing 19.

A straight cylindrical rotor 22 is supported in bearings 17 and 19, and is provided at one end with a splined hole 23 through which it may be driven, and with four radial slots 24, through which the vanes 25 slide.

A ring or pump gasket 26, preferably made of resilient or deformable material such as for instance synthetic rubber, is pressed against bearing 19 by the beveled end 27 of gland 28, which is assembled to the flange 29 of the pump housing 11 by means of screws 30 (Figures 2 and 4). The parts are preferably so proportioned that when the screws 30 are tightened, bearings 16 and 17, liner 18 and bearing 19 are all pressed against the end wall 15, and seal ring 26 is compressed and preferably deformed to produce a fluid tight seal between bore 14 and gland 28, and so prevent the passage of fluid from the pump side 31 of gland 28 to the other or outer side 32 along said bore. Excessive squeezing of the pump seal ring 26 is prevented by the gland flange 33 which comes in contact with flange 29.

When the whole pump is assembled to an engine mounting flange 34 by means of the usual bolts 35 and nuts 36, the heads of screws 30 are covered by said flange 34 and the additional powerful action of nuts 36 holds together flanges 33 and 29. It is thus clearly apparent that by my structure I avoid the use of large threaded bodies such as are used in some structures in which a large gland is threaded into a housing, and not only do I avoid the danger of seizure of such large threads, particularly if the parts are made of aluminum, but I also avoid the expensive tools and operations necessary for such threads, and at assembly completely exclude the human element as a factor in the tightness and compression of the pump seal. Furthermore, I do not need to make screws 30 very accurate or strong, nor do I need to lock them, as they are relied upon only to hold the parts together during storage and transit, while when the pump is in operation all the parts are securely held by the usually powerful studs 35 and nuts 36. On the other hand to disassemble my pump, a screw driver is the only tool needed to loosen the screws 30, after which the gland, shaft, and related parts slip out of the pump housing and fall apart one from the other.

Gland 28 is provided with a land 37 (Fig. 6) which holds it in central position relative to the bore 14, and with a concentric land 38 which is useful in mounting the pump assembly centrally on, for instance, the mounting flange 34 usually provided for it on the engine (not shown).

In its central portion, the gland 28 is also provided with an inner flange 39 and recessed seat 40, with four radially spaced openings 41 preferably cored out in casting so as to leave four pillars 42, and with a second inner flange 43. A ring or gasket 49 of soft or resilient material such for instance as synthetic rubber, is lodged in the recessed seat 40 and supports centrally and squarely with the bore a seal seat 50, preferably made of wear resistance material such as bronze.

A shaft 51 is provided with two splined ends, one, 52, for driving the rotor 22, and the other, 53, for connection to the pump driving means. The shaft 5, is also provided with a flange 54 which is pressed against said seal seat 50 by means of a spring 55, and with a second flange 56 substantially in line with the flange 43 with which it forms a wall of protection for the inside of the pump against the introduction of foreign matter. It is clear that the rubber gasket 49 is helpful in taking care of misalignment between the shaft 51 and the gland 28 or mounting flange 24, and by its resiliency allows the seal seat 50 to follow flange 54 in its possibly wabby movement, and so effectively prevents leaks past said seat.

The spring 55 at the other end presses against said rotor 22, which in turn rests against the thrust bearing 16.

The pump housing 11 is provided with two cavities or openings 60 and 61 symmetrically opposite each other with reference to the rotor 22, and with two ports 62 and 63 connected thereto, respectively. The pump will operate in either direction but for the purpose of simplicity of description we will assume that it is operating in anti-clockwise direction, as shown by an arrow 64 in Figure 5. Then, cavity 60 and port 62 will be on the inlet or low pressure side, and cavity 61 and port 63 will be on the outlet or high pressure side.

The valve housing 12 and valve cover 13 are fastened to the pump housing 11 by means of bolts 65, which are preferably located in plan view according to a pattern symmetrical with reference to the pump axis, so that the valve housing can be inverted or rotated 180° when the pump is operated in clockwise direction.

The valve housing 12 is provided with an outlet or pressure side opening or chamber 66 which communicates with the outlet port 63 of the pump, and which for simplicity of description will also be called the lower chamber; and with an inlet or suction side opening or chamber 67 which communicates with the inlet port 62 and which will also be called the upper chamber, with the understanding, however, that the expressions "upper" and "lower" do not in any manner define or limit the relative location of said chambers to each other or to the pump housing.

Said chambers are separated by a partition or wall 68 which is provided with a port or valve seat 69, which may be closed by relief valve 70.

The lower part of said relief valve 70 terminates in a cylindrical portion 71 which is guided in a bore 72 provided in the lower wall 73 of said valve housing 12, while the upper part 75 is also cylindrical and is guided in a bore 76.

The upper surface 77 (Fig. 5) of pump housing 11, the bore 72, and the valve lower wall 73 confine a space or dash-pot cavity 78. A gasket 79 is preferably provided between said pump housing 11 and said valve housing 12.

The relief valve 70 itself is divided into two sections by a horizontal wall 80 (Fig. 6) which provides an opening or seat 81 in which a by-pass valve seat 82 is lodged. A by-pass disc or valve 83 is pressed against said valve seat 82 by a spring 84 and completes the horizontal wall of elements 68, 80, 82, and 83 which close communication between the upper and lower chambers.

The numerals 85 and 86 indicate ribs cast in the valve housing 12 to stiffen the structure and promote smoother flow of the fluid therethrough.

The relief valve 70 is provided with upper lateral ports 89 and lower lateral ports 100, and by-pass valve seat 82 is provided with lateral ports 101 and an axial port 102.

A diaphragm 103 is held in fluid tight manner at its outer edge between the valve housing 12 and the cover 13, and rests in its central portion against the by-pass valve seat 82. On diaphragm 103 is mounted a washer 104 provided with a seat 105 for a ball 106, which in turn is held at its upper side in a seat 107 provided in a spring washer 108. Said washer 108 carries on its locating seat 109 an adjusting spring 110 which at its upper end presses against a seat 111 of an adjusting washer 112 into which an adjusting screw 113 is threaded.

The valve cover 13 is formed with a bore 114 and a counterbore or seat 115. Said adjusting screw 113 is provided with a flange 116 which rests in the counterbore 115, and with an upper threaded stem 117 which fits into the bore 114 and may be clamped tight to the cover 13 by means of a check nut 118, or may be rotated, for instance, by means of screw driver slot 119.

The valve cover 13 is provided on the inside with a vertical groove 120 in which a finger 121 of the washer 112 can slide up and down while at the same time preventing said washer 112 from rotating. When the adjusting screw 113 is turned, said finger 121 prevents the washer 112 from rotating and the consequent action of the threaded hole 122 in the center of said washer 112 compels said washer to move up and down and so adjust the spring tension as desired.

An important advantage of this construction is that the flange 116 of the adjusting screw 113 is pressed against its seat 115 at all times by the tension of said spring 110 and therefore is prevented from accidental rotation by the resultant friction and has no tendency to lose its adjustment even if the check nut 118 is left loose. Furthermore said flange 116 by being pressed against its seat provides a fluid tight closure, the effectiveness of which is only increased by the application of supercharger pressure above the diaphragm, for instance, through a port 123.

It will be seen that as the rotor 22 and vanes 24 rotate in the direction indicated by the arrow 64, the fluid is carried from the inlet or low pressure port 60 to the outlet or high pressure port 61, and if the free flow thereafter is impeded, pressure is built up on the outlet side.

When the pressure attains a predetermined value, the relief valve 70 is lifted from its seat 69 against the opposing action of the spring 110, and the fluid flows between said seat 69 and valve 70 and through the port 67 back to the inlet side and to said openings 62 and 60.

Should there be any tendency for the fluid pressure to pulsate, and therefore for the valve 70 to vibrate or bounce on and off its seat, it will be seen that the lower part 71 of said valve will act as a piston in the cylinder 72 and trap fluid in the chamber 78, so that a dash-pot action will be obtained and the vibrations of said valve 70 will be minimized.

Should it be desirable to pump fluid from the port 60 to the port 61 by means independent from the pump proper, for instance when the pump is out of order or when the engine is not turning, the fluid from the inlet ports 60 and 62 will pass through ports 67, 89, 101 and 102, will lower the valve disc 83 against the force of the spring 84, and after passing through the ports 100, 66, and 63 will reach the outlet port 61. It is clear that the disc 83 may be made very light and thin, and of light material such as bakelite. Furthermore, said disc 83 is normally pressed against its seat 82 by the fluid pressure on the outlet side, so that the spring 84 may be very light, with the result that the drop of pressure of fluid by-passed through the valve will be very small.

It is a known fact that it is very difficult to produce springs whose ends will stay naturally parallel when free and when under tension. Usually, as the spring is compressed, its ends tend to twist out of parallel and form an angle, and the direction of the spring action does not remain axial. In other words it may be said that if one end is held stationary and the other one is compressed, said other one will tend to rotate as it moves axially, and the spring will give a torque component besides the expected axial reaction component.

This is an important factor in bringing about stickiness in valves that are spring pressed, as the torque component will twist the valve sideways against its guiding means, causing the valve to stick and bind. The present invention provides means whereby any spring tendency to twist spends itself freely and no binding action is transmitted to the valve.

In fact, if the lower face of the spring 110 has any tendency to twist or rotate it can freely do so, as it rests on the washer 108 which can freely rotate around ball 106, which in turn transmits only an axial component of force to the washer 104, which, through the diaphragm 103 and the valve seat 82 presses on the valve 70.

It will be noted that the adjusting screw 113 is held or guided on the vertical axis of the pump and valve assembly by the bore 114 and counterbore 115, and in turn holds and guides on said axis the adjusting washer 112, which in turn through the shoulder 111 guides the spring 110. The lower end of said spring 110 rests around the shoulder 109 and centers the washer 108, while ball 106 resting in seats 107 and 105 centers the washers 108 and 104, so that washer 104 is finally held on the axis of the valve assembly without having any lateral guides which might introduce friction and binding action. In conclusion, there is nothing in the valve assembly constructed in accordance with the present invention that can produce binding action, and the result, confirmed in practice, is that said valve 70 is extremely free in its movement and gives very sensitive pressure control.

The structure described will give best results if the spring 110 is of rather large diameter in proportion to its length, so it will rest squarely at both ends and keep the parts in line at assembly.

The valve seat 69, the diaphragm 103, and the related parts are preferably so proportioned that the effective area of the diaphragm equals the effective area of the relief valve 70, so that variations in the fuel pressure at the inlet side will have no influence on the pressure regulation. Furthermore, if pressure is applied to the upper side of the diaphragm, for instance by means of the engine supercharger acting through the port 123, the result will be the same as if said pressure were applied directly on the top of the relief valve, namely, the outlet pressure adjustment will be increased in direct proportion to the supercharger pressure applied.

It will be noted that diaphragm 103 is preferably made of resilient and easily compressible material such for instance as synthetic rubber. The shoulder, groove, or free space 124 left between the valve housing 12 and the cover 13 is preferably made slightly narrower than the diaphragm thickness, so that when the whole assembly is tightened together by means of the screws 65, the diaphragm remains clamped all around at its periphery in a fluid tight manner, and fills at least in part the circular groove 125 forming undulations or rings which are beneficial in insuring fluid tightness even in the event that the diaphragm material should take a permanent set.

In valves provided with diaphragms as known in the art we usually find bolts that go through the diaphragm and washers and nuts to fasten rods or similar parts to the diaphragm and pick up its action. The holes in the diaphragm material and the squeezing action of the bolts and washers are a continuous source of trouble, as the holes provide a good starting point for diaphragm cracks. Furthermore, the nuts or clamping means are often assembled too loose and produce a leak, or too tight and squeeze and break the diaphragm, with leaks again as a result. Other known structures resort to deep-drawn or bellow shaped diaphragms which are expensive to manufacture and unreliable in service. The present invention allows the use of the simplest form of diaphragm, a plain flat disc, without any central holes or tightening means. Of course such a flat diaphragm is usually preferable, but other types of diaphragms or bellows or equivalent pressure responsive means known in the art could be substituted without departing from the spirit of the present invention.

The spring 110 presses the washer 104 against the diaphragm 103 and the diaphragm against the by-pass valve seat member 82 which rests on relief valve 70. Whether said relief valve 70 is resting on its seat 69 or is lifted by the outlet pressure, the spring pressure keeps the diaphragm tightly held between the washer 104 and the valve seat member 82, and said diaphragm transmits its action upwards against the spring 110 or downwards against the valve seat member 82 and thereby on to the valve 70, as the case may be.

In a similar manner the by-pass valve seat member 82 is pressed in a fluid-tight manner against the relief valve 70 by the spring 110 without the use of further fastening means.

The result of this construction is that when the four screws 65 that hold the valve assembly together are released, all of the valves and related parts come apart, and then they may be assembled together again with equal ease and without the use of any tools.

It can be noted that fuel pressures used at present in aircraft installations are mostly in the range of 3–20 lbs. per square inch, and as a consequence if the relief valve area is for instance one and a half square inches, spring 110 should be adjusted to a tension of approximately 4.5 to 30 pounds. On the other hand, the by-pass spring 84 is preferably made as light as possible, and since it is assisted by the outlet pressure in keeping the valve disc 83 closed, it is usually made just strong enough to hold the disc 83 up to the valve seat member 82 against gravity and vibrations. The ratio of tension between the spring 110 and the spring 84 may thus be of the order of 400:1 to 3000:1, and the action of the spring 84 in tending to lift the valve seat member 82 from the valve 70, thereby counteracting the tension of the spring 110, may be disregarded.

No claim is made in the present application to any particular type of bore in the pump chamber 18, nor to any particular type of vanes operable therein, many being known in the art.

It will, of course, be understood that various details of construction may be varied through a wide range without departing from the principles of this invention and it is, therefore, not the purpose to limit the patent granted hereon otherwise than necessitated by the scope of the appended claims.

What I claim is:

1. In a fluid transfer mechanism including a pump housing providing a cylindrical bore closed at one end and open at the other end, a thrust bearing in said bore adjacent said closed end, a pair of spaced journal bearings, a pump liner positioned between said journal bearings, a rotor journaled in said journal bearings for rotation within said liner and having at one end a driving connection, a shaft cooperating with said connection for driving said rotor and provided with a fixed peripheral flange, and a spring surrounding said shaft and compressively confined between said rotor and said flange, the improvement which comprises providing an attaching flange at the open end of said housing, a gland having an outer peripheral flange adapted to overlie the face of said attaching flange and to be secured thereto, said gland having an intermediate restricted portion providing an annular shoulder and having an inwardly extending annular portion slidably fitting said cylindrical bore and terminating adjacent the outer of said bearings, a resilient packing held under compression by said gland annular portion against said outer bearing and the bore wall, a seal ring between said shaft flange and said annular shoulder on said gland, and a mounting flange for said pump secured to said attaching flange with said gland flange clamped therebetween.

2. In a fluid transfer mechanism including a pump housing providing a cylindrical bore closed at one end and open at the other end, a thrust bearing in said bore adjacent said closed end, a pair of spaced journal bearings, a pump liner positioned between said journal bearings, a rotor journaled in said journal bearings for rotation within said liner and having at one end a driving connection, a shaft cooperating with said connection for driving said rotor and provided with a fixed peripheral flange, and a spring surrounding said shaft and compressively confined between said rotor and said flange, the improvement which comprises providing an attaching flange at the open end of said housing, a gland slidably insertable in the open end of said bore to fit snugly therein and provided with an outer peripheral flange adapted to overlie the face of said attaching flange and be secured thereto, said gland having an intermediate shouldered portion facing inwardly toward said shaft flange, a resilient gasket seated in said shouldered portion, a seal ring mounted between said gasket and said shaft flange, said gland also having an inwardly extending annular portion slidably fitting said bore and terminating adjacent the outer of said bearings, and a resilient packing compressively held by said gland annular portion against said outer bearing and the bore wall to seal the same.

3. In a fluid transfer mechanism including a pump housing providing a cylindrical bore closed at one end and open at the other end, a thrust bearing in said bore adjacent said closed end, a pair of spaced journal bearings, a pump liner positioned between said journal bearings, a rotor journaled in said journal bearings for rotation within said liner and having at one end a driving connection, a shaft cooperating with said connection for driving said rotor and provided with a fixed peripheral flange, and a spring surrounding said shaft and compressively confined between said rotor and said flange, the improvement which comprises providing an attaching flange at the open end of said housing, a gland slidably insertable in the open end of said bore to fit snugly therein and provided with an outer peripheral flange adapted to overlie the face of said attaching flange and be secured thereto, said gland having an intermediate shouldered portion facing inwardly toward said shaft flange, a resilient gasket seated in said shouldered portion, a seal ring mounted between said gasket and said shaft flange, said gland also having an inwardly extending annular portion slidably fitting said bore and terminating adjacent the outer of said bearings, a resilient packing compressively held by said gland annular portion against said outer bearing and the bore wall to seal the same, a mounting flange for said pump overlying the peripheral flange of said gland and fastening means passing through said attaching flange, gland flange and mounting flange to hold the parts of said pump together during operation.

4. In a fluid transfer mechanism including a pump housing providing a cylindrical bore closed at one end and open at the other end and pump parts operatively assembled within said bore, the improvement for maintaining said pump parts in assembled relationship during shipment which comprises providing said pump housing with an attaching flange at said open end of said housing, a gland slidably insertable in the open end of said bore and having an inner annular portion fitting snugly within said bore and bearing against some of said pump parts to hold the same in assembled relationship and provided with an outer peripheral flange overlying said attaching flange, and means securing said two flanges together to hold said pump parts in assembled relationship.

5. In a fluid transfer mechanism including a pump housing providing a cylindrical bore closed at one end and open at the other end and pump parts operatively assembled within said bore, the improvement for maintaining said pump parts in assembled relationship during shipment and during operation which comprises providing said pump housing with an attaching flange at said open end of said housing, a gland slidably insertable in the open end of said bore and having an inner annular portion fitting snugly within said bore and bearing against some of said pump parts to hold the same in assembled relationship and provided with an outer peripheral flange overlying said attaching flange, means securing said two flanges together to hold said pump parts in assembled relationship, a mounting flange overlying said attaching flange, and pump mounting means passing through all three of said flanges to hold the same tightly together and to reinforce said flange securing means in holding said pump parts in proper assembled relationship during operation.

6. The combination with an engine mounting flange of a pump for mounting thereon, said pump comprising a housing having an end flange, pump elements including an outer thrust ring operatively assembled within said housing, a closure member having an end flange overlying said housing end flange and having an inwardly extending portion slidably insertable into said housing to confine said thrust ring in place, fastening means securing said two end flanges together to hold said pump elements in assembled relationship within said housing, and other fastening means securing all three of said flanges together with said closure member end flange clamped between said housing flange and said engine mounting flange.

MICHELE CASERTA.

REFERENCES CITED

The following references are of record in the file of this patent:

UNITED STATES PATENTS

| Number | Name | Date |
| --- | --- | --- |
| 1,944,648 | Saussard | Jan. 23, 1934 |
| 1,989,900 | Vickers | Feb. 5, 1935 |
| 2,141,171 | Centervall | Dec. 27, 1938 |
| 2,189,675 | Parker | Feb. 6, 1940 |
| 2,192,588 | Heckert | Mar. 5, 1940 |
| 2,212,833 | Huber | Aug. 27, 1940 |
| 2,263,091 | Johnson | Nov. 18, 1941 |
| 2,268,804 | Curtis | Jan. 6, 1942 |
| 2,280,392 | Herman, et al | Apr. 21, 1942 |
| 2,289,441 | Le Valley, et al | July 14, 1942 |
| 2,318,337 | Schlosser | May 4, 1943 |
| 2,351,817 | Johnson | June 20, 1944 |

FOREIGN PATENTS

| Number | Country | Date |
| --- | --- | --- |
| 596,943 | France | Aug. 21, 1925 |